(12) United States Patent
Sicurella

(10) Patent No.: US 7,578,100 B2
(45) Date of Patent: Aug. 25, 2009

(54) STRUCTURAL WIND PROTECTIVE SYSTEM AND METHOD

(76) Inventor: Daniel J. Sicurella, 701 Bradford, Kemah, TX (US) 77565

( * ) Notice: Subject to any disclaimer, the term of this patent is extended or adjusted under 35 U.S.C. 154(b) by 99 days.

(21) Appl. No.: 11/545,700

(22) Filed: Oct. 10, 2006

(65) Prior Publication Data

US 2008/0083169 A1  Apr. 10, 2008

(51) Int. Cl.
  *E04D 1/34* (2006.01)
  *B62D 63/04* (2006.01)
  *D04H 1/00* (2006.01)
  *B32B 3/06* (2006.01)

(52) U.S. Cl. .............. 52/4; 52/3; 52/DIG. 12; 52/DIG. 14

(58) Field of Classification Search .......... 52/3, 52/4, DIG. 12, DIG. 14, 23; 428/99, 193; 442/2, 203, 205–207; 135/117, 118, 120.4, 135/97, 903, 913; 410/97, 100, 118
See application file for complete search history.

(56) References Cited

U.S. PATENT DOCUMENTS

| | | | | |
|---|---|---|---|---|
| 39,954 | A * | 9/1863 | Powell et al. | 5/113 |
| 429,355 | A * | 6/1890 | Miller | 135/90 |
| 544,871 | A * | 8/1895 | Turner | 135/90 |
| 641,278 | A * | 1/1900 | Dick | 182/139 |
| 1,106,353 | A * | 8/1914 | Adamec | 52/4 |
| 1,600,749 | A * | 9/1926 | Barnes | 47/23.2 |
| 1,603,785 | A * | 10/1926 | Marbury | 135/87 |
| 1,650,323 | A * | 11/1927 | Byars | 135/120.1 |
| 1,925,815 | A * | 9/1933 | Nicolson | 135/97 |
| 2,017,625 | A * | 10/1935 | Kellems | 294/86.42 |
| 2,029,886 | A * | 2/1936 | Marshall | 135/132 |
| 2,349,993 | A * | 5/1944 | Schwimmer et al. | 135/97 |
| 2,455,237 | A * | 11/1948 | Davis | 410/97 |
| 2,705,461 | A * | 4/1955 | Campbell | 410/97 |
| 2,788,791 | A * | 4/1957 | Pospisil et al. | 135/88.07 |
| 3,054,151 | A * | 9/1962 | Shankland | 52/23 |
| 3,099,313 | A * | 7/1963 | Peck et al. | 410/118 |
| 3,715,843 | A * | 2/1973 | Ballinger | 52/3 |
| 3,715,873 | A * | 2/1973 | Ballinger | 52/3 |

(Continued)

FOREIGN PATENT DOCUMENTS

GB  2257171 A  6/1993

(Continued)

OTHER PUBLICATIONS

Web Page: "Paranet" Linear Composites, Ltd (Maccaferri) www.maccaferri.com.

(Continued)

*Primary Examiner*—Robert J Canfield
*Assistant Examiner*—Charissa Ahmad
(74) *Attorney, Agent, or Firm*—Browning Bushman, P.C.

(57) ABSTRACT

A system and method for protecting a structure from wind damage utilizes a netting 12 positioned over the roof of the structure and a plurality of ground anchors 16, 17 at least partially below ground level and spaced from the structure. A plurality of perimeter cables 18, 20, 34 are each spaced about a perimeter portion of a netting when deployed, and a plurality of tie-downs 22 each interconnect one of the plurality of perimeter cables to a respective one of the plurality of anchors.

17 Claims, 2 Drawing Sheets

U.S. PATENT DOCUMENTS

| | | | | |
|---|---|---|---|---|
| 3,769,763 | A * | 11/1973 | Kwake | 52/2.25 |
| 3,783,766 | A * | 1/1974 | Boucher | 52/2.23 |
| 3,805,816 | A * | 4/1974 | Nolte | 135/115 |
| 3,856,072 | A * | 12/1974 | Sund | 160/84.01 |
| 4,033,367 | A * | 7/1977 | Johnston | 135/100 |
| 4,231,289 | A * | 11/1980 | Domicent | 454/52 |
| 4,364,205 | A * | 12/1982 | Scott | 52/4 |
| 4,738,006 | A * | 4/1988 | Juarez | 24/115 A |
| 4,815,562 | A * | 3/1989 | Denny et al. | 182/138 |
| 4,858,395 | A * | 8/1989 | McQuirk | 52/3 |
| 4,892,210 | A * | 1/1990 | Kupersmit | 220/1.5 |
| 4,986,389 | A * | 1/1991 | Halligan et al. | 182/138 |
| 5,174,073 | A * | 12/1992 | Sabo | 52/3 |
| 5,197,239 | A * | 3/1993 | Glynn et al. | 52/63 |
| 5,240,756 | A * | 8/1993 | Finell et al. | 428/45 |
| 5,347,768 | A | 9/1994 | Pineda | |
| 5,355,640 | A * | 10/1994 | Frye | 52/23 |
| 5,388,702 | A * | 2/1995 | Jones | 206/597 |
| 5,522,184 | A * | 6/1996 | Oviedo-Reyes | 52/23 |
| 5,570,545 | A * | 11/1996 | Adams | 52/3 |
| 5,579,794 | A * | 12/1996 | Sporta | 135/88.01 |
| 5,582,266 | A * | 12/1996 | Rexroad et al. | 182/138 |
| 5,697,191 | A * | 12/1997 | MacKarvich | 52/169.9 |
| 5,791,090 | A * | 8/1998 | Gitlin et al. | 52/4 |
| 5,819,477 | A * | 10/1998 | Gaffney | 52/23 |
| 5,829,200 | A * | 11/1998 | Jones et al. | 52/3 |
| 5,848,665 | A * | 12/1998 | Rexroad et al. | 182/138 |
| 5,850,718 | A * | 12/1998 | MacKarvich | 52/292 |
| 5,881,499 | A * | 3/1999 | Luzzi | 52/23 |
| 5,966,877 | A * | 10/1999 | Hawes | 52/63 |
| 5,974,740 | A * | 11/1999 | Park | 52/3 |
| 6,010,176 | A * | 1/2000 | Jones | 296/100.16 |
| 6,017,174 | A * | 1/2000 | Ross et al. | 410/100 |
| 6,068,085 | A * | 5/2000 | Denny et al. | 182/138 |
| 6,088,975 | A * | 7/2000 | Wiegel | 52/169.1 |
| 6,161,648 | A * | 12/2000 | Rexroad et al. | 182/138 |
| 6,176,050 | B1 * | 1/2001 | Gower | 52/222 |
| 6,412,540 | B2 * | 7/2002 | Hendee | 160/327 |
| 6,418,953 | B1 * | 7/2002 | Novotny | 135/156 |
| 6,419,432 | B1 * | 7/2002 | Chou | 410/97 |
| 6,419,433 | B1 * | 7/2002 | Chou | 410/97 |
| 6,453,621 | B1 * | 9/2002 | Bundy et al. | 52/3 |
| 6,474,022 | B1 * | 11/2002 | Double et al. | 52/3 |
| 6,742,305 | B2 * | 6/2004 | Rogers et al. | 52/3 |
| 6,758,306 | B2 * | 7/2004 | Walls et al. | 182/138 |
| 6,783,312 | B2 * | 8/2004 | Smith | 410/97 |
| 6,810,626 | B2 * | 11/2004 | Meyer et al. | 52/1 |
| 6,820,373 | B1 * | 11/2004 | Bundy et al. | 52/1 |
| 6,851,903 | B1 * | 2/2005 | Foggy | 410/118 |
| 6,865,852 | B2 * | 3/2005 | Gower | 52/222 |
| 7,063,227 | B2 * | 6/2006 | Looker | 220/345.1 |
| 7,350,556 | B2 * | 4/2008 | Pernicano | 160/243 |
| 7,392,620 | B1 * | 7/2008 | Watson, Jr. | 52/4 |
| 7,395,869 | B2 * | 7/2008 | Schnabel et al. | 169/48 |
| 7,448,836 | B2 * | 11/2008 | Clarke et al. | 410/97 |
| 2002/0166289 | A1 * | 11/2002 | Oviedo-Reyes | 52/4 |
| 2003/0213192 | A1 * | 11/2003 | Pittman | 52/223.1 |
| 2004/0035059 | A1 * | 2/2004 | Meyer et al. | 52/1 |
| 2004/0074152 | A1 * | 4/2004 | Rogers et al. | 52/3 |
| 2006/0075690 | A1 * | 4/2006 | Murray | 52/23 |
| 2006/0150529 | A1 * | 7/2006 | Hogg et al. | 52/3 |
| 2006/0207191 | A1 * | 9/2006 | Sutton | 52/4 |
| 2007/0000183 | A1 * | 1/2007 | Logan | 52/3 |
| 2007/0209291 | A1 * | 9/2007 | Perez | 52/23 |
| 2007/0266643 | A1 * | 11/2007 | Cowvins | 52/3 |
| 2007/0266644 | A1 * | 11/2007 | Weicht | 52/3 |

FOREIGN PATENT DOCUMENTS

WO     WO 93/00491     1/1993

OTHER PUBLICATIONS

Pamphlet: "Safe-T-Net" Advent Product Development, product #19165, Feb. 17, 2006.

* cited by examiner

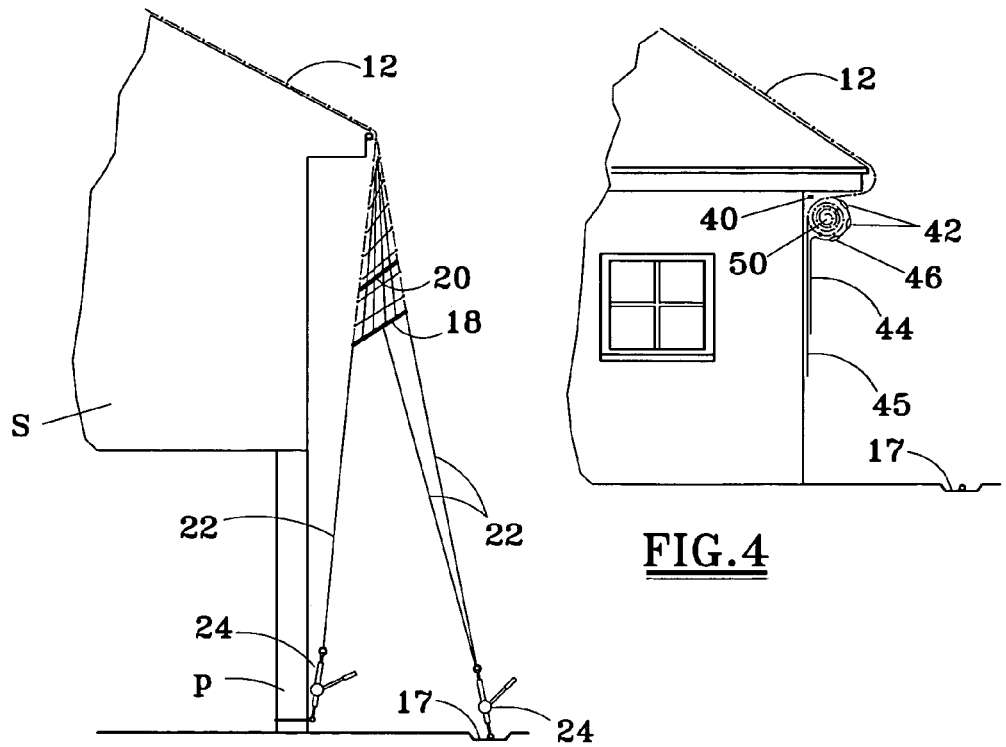
FIG.3
FIG.4
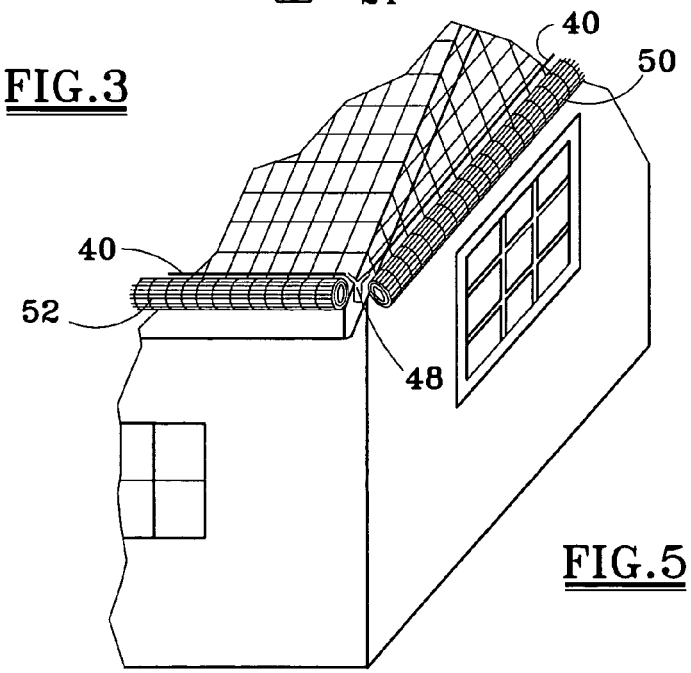
FIG.5

STRUCTURAL WIND PROTECTIVE SYSTEM AND METHOD

FIELD OF THE INVENTION

The present invention relates to a system and method for protecting a house, building or other structure from high winds, such as those experienced during a hurricane. More particularly, the invention relates to a readily employable wind protective system utilizing a net substantially covering the roof of the structure and a plurality of perimeter tie-down cables between perimeter portions of the net and one of a plurality of anchors.

BACKGROUND OF THE INVENTION

Various systems have been devised in an attempt to reduce damage to homes and other structures during a hurricane. U.S. Pat. No. 5,347,768 discloses a net secured to the roof of a structure, and another patent discloses a different type of system for reducing wind damage to a structure. Publication WO93/00491 discloses a net secured to and covering the roof of a structure. A device promoted as the Safe-T-Net provides for a net on a roof, with tie-downs to the base of the building. None of these devices, however, has achieved significant commercial success, in part because of the time involved in covering the building with a netting, and due to the unreliability of securing the netting in place during a storm.

The disadvantages of the prior art are overcome by the present invention, and an improved system and method are provided for protecting a structure from wind damage.

SUMMARY OF THE INVENTION

In one embodiment, a system for protecting a structure including a roof from wind damage comprises a netting for positioning over the roof of the structure, a plurality of anchors at least partially below ground level, and a plurality of perimeter cables each about a perimeter portion of the netting. The plurality of perimeter cables include a low cable secured to the netting and a high cable secured to the netting above the low cable. A plurality of tie-downs each interconnect one of the plurality of cables to a respective one of the plurality of anchors.

In another embodiment, the system includes a netting for positioning over the roof of the structure, at least one perimeter cable about a perimeter portion of the netting, and a plurality of tie-downs each secured to one of an anchor at least partially below the ground level and a piling for supporting the structure above the ground level.

According to one embodiment, a method for protecting a structure including a roof from damage positions a netting for deployment over the roof of a structure, and provides a plurality of anchors each at least partially below ground level and spaced from the structure. A plurality of perimeter cables are provided about a perimeter portion of the netting when deployed, with the plurality of perimeter cables including a low cable secured to the perimeter portion of the netting and a high cable secured to the perimeter portion of the netting above the low cable. Tie-down interconnect one of the plurality of cables to a respective one of the plurality of anchors.

These and further features and advantages of the present invention will become apparent from the following detailed description, wherein reference is made to the figures in the accompanying drawings.

BRIEF DESCRIPTION OF THE DRAWINGS

FIG. 3 is a side view through a central portion of the house, illustrating the cables tied down to one of the structure pilings, with the ends of the cables tied to a respective corner anchor.

FIG. 4 illustrates a suitable embodiment for storing a reel of netting under the eave of a structure.

FIG. 5 illustrates the corner of a structure with netting positioned near the edge of the roof, and also along the side of the structure.

DETAILED DESCRIPTION OF PREFERRED EMBODIMENTS

Figure 1:
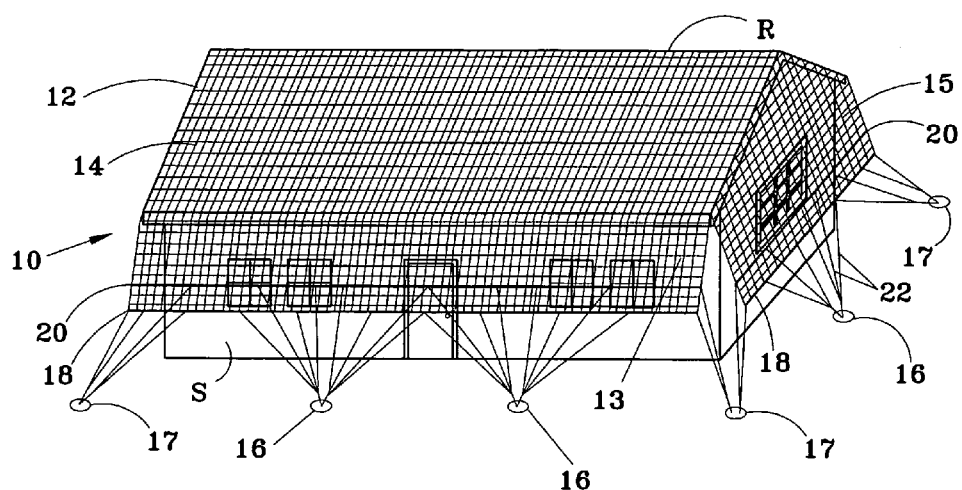
FIG. 1 is a pictorial illustration of a generally rectangular structure with netting covering the roof and extending downward along each side toward a respective anchor.

FIG. 1 depicts a suitable system 10 for protecting a structure S including a roof R from wind damage. The system comprises a netting 12, including net roof portion 14 for covering the roof, perimeter net portions 13 covering the front and back of the depicted structure, and shorter net portions 15 covering the right side or left side of the structure. Along each perimeter portion of the netting, a pair of perimeter cables 18, 20 are provided, with the perimeter cables including a low cable 18 secured to the perimeter portion of the netting and a high cable 20 secured to the same perimeter portion of the netting above the low cable. Each of the perimeter cables may be woven between strands of the netting to secure each cable to the netting. A plurality of corner anchors 17 each extend outward from one of the primary four corners of the structure, while intermediate anchors 16 in front of, behind, and on a left side and a right side of the building allow for additional tie-down of the respective cables 18, 20 and the netting wound between these cables to these anchors.

Figure 2:
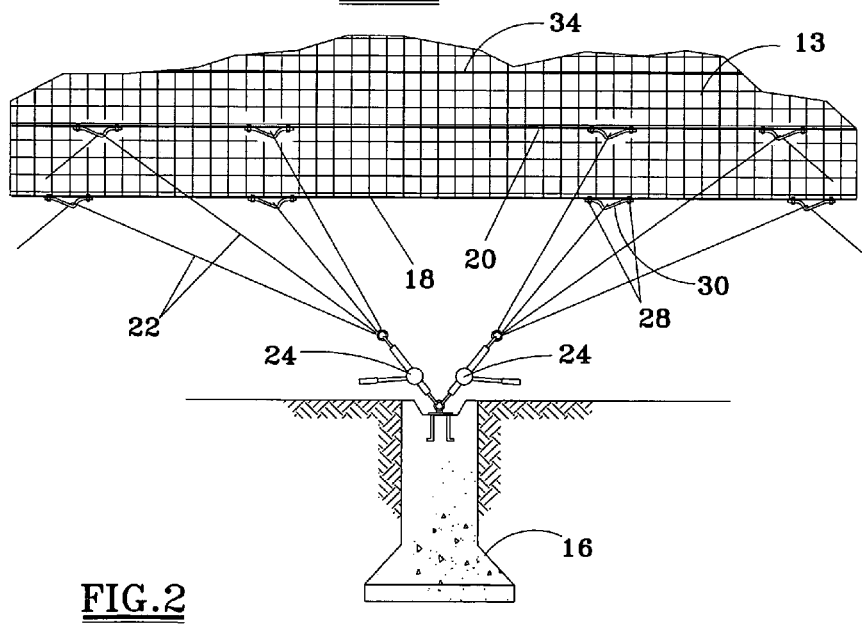
FIG. 2 illustrates a suitable mechanism for connecting an anchor to a plurality of perimeter cables to an anchor.

FIG. 2 illustrates in greater detail a low perimeter cable 18, a high perimeter cable 20, and a still higher perimeter cable 34. Three or more vertically spaced cables may thus be used for securing each perimeter portion of the netting to a respective anchor. Each of these cables may be secured to a suitable anchor 16 by a tie-down 22, and preferably an end of each tie-down 22 is secured to a respective cable 18, 20 by a short tie-down loop 30, with ferrules 28 anchoring the ends of each loop 30 to the respective cable. As shown in FIG. 2, one or more suitable tensioning devices 24 may be provided for tensioning each of a plurality of tie-down cables 22. The anchor 16 is at least partially if not fully below ground level, and may consist of steel and/or concrete extending several feet or more below ground level.

In a preferred embodiment, the netting is formed from a polyethylene material, and has voids between strands of from about 3 inches to about 5 inches. The plurality of perimeter cables 18, 20, 34 may each be formed from stainless steel cable.

Referring now to FIG. 3, there is shown a portion of a structure S with the cables 18 and 20 tying down a perimeter portion 13 of the netting adjacent a middle portion of the structure, wherein the tie-downs 22 extend to one of a plurality of piling P extending upward from the ground for supporting the structure thereon. Also shown in FIG. 3 is one of the corner anchors 17 which may be spaced outward of the structure as shown in FIG. 1, with the tie-downs 22 extending to anchor 17, pulling the netting further away from the side of the building. FIG. 3 thus depicts the use of pilings for supporting the structure above ground level and providing some of the anchors for the netting, thereby reducing the forces acting on the perimeter anchors 16, 17.

FIG. 4 depicts a suitable technique for storing the netting, which may continuously cover the roof of the house during hurricane season. A support wire 40 may be secured at its ends to the eaves of the structure and positioned under the overhang of the house and stretched taunt, so that the netting can be wound and temporarily secured to the cable 40 by electrical ties or other suitable wrappings. Preferably, these ties are eliminated after the roll deployment device 46 is installed for maintaining the netting roll positioned under the overhang, and for releasing the roll by pulling on line 44 to release the netting, so that the perimeter portion of the netting may be quickly and easily tied down to respective anchors or pilings. In a preferred embodiment, the deployment device consists of a daisy loop cord or other line 42 which wraps about the netting roll and releases the wound roll when pulled. A deployment line 45 may also be provided for releasing the deployment device when activated. The deployment line 45 may be secured to a lower end of the netting and is wound with the netting in the roll to assist in unrolling the wound netting. More particularly, the wound netting may not freely unwind once the deployment device is activated, and the deployment line 45 assists by allowing a slight unrolling force to be executed by the user to allow the roll to unwind.

As shown in FIG. 5, another embodiment is provided wherein the wound netting for the front and back perimeter portions of the netting are stored on the upper surface at the lower edge of the roof. The rolled netting may include the roll release device and a deployment line as discussed above. FIG. 5 also depicts the netting roll on the side of the house. For this application, a suitable upwardly extending bracket 48 may be provided for securing each end of cable 40 in place. Each roll may be temporarily held in place on the line 40 by suitable ties, which may be removed once the line 42 is in place to secure the netting in a wound form. An anchor cable 40, a roll deployment device 42, and a deployment line 44 may be provided for both the roll 50 which stores a perimeter side portion of the netting, and the roll 52 which stores a perimeter front of back portion of the netting.

Although specific embodiments of the invention have been described herein in some detail, this has been done solely for the purposes of explaining the various aspects of the invention, and is not intended to limit the scope of the invention as defined in the claims which follow. Those skilled in the art will understand that the embodiment shown and described is exemplary, and various other substitutions, alterations and modifications, including but not limited to those design alternatives specifically discussed herein, may be made in the practice of the invention without departing from its scope.

What is claimed is:

1. A system for protecting a structure including a roof from wind damage, comprising:
    a netting for positioning over the roof of the structure, the netting having a deployed position wherein a perimeter portion of the netting is spaced below the roof of the structure, and the netting having a storage position wherein a portion of the netting is in a roll adjacent a roof overhang;
    a plurality of anchors each at least partially below ground level and spaced from the structure;
    a plurality of perimeter cables each woven between strands of the perimeter portion of the netting, the plurality of perimeter cables including a low cable on one side of the structure and secured to the perimeter portion of the netting and a high cable on the one side of the structure and secured to the perimeter portion of the netting above the low cable; and
    a plurality of tie-downs each extending between one of the plurality of anchors and the low cable when the netting is in the deployed position, and another plurality of tie-downs each extending between the high cable and the one of the plurality of anchors when the netting is in the deployed position.

2. A system as defined in claim 1, further comprising:
    a device for tensioning each of the plurality of tie-downs when the netting is in the deployed position.

3. A system as defined in claim 1, wherein the netting is formed from a polyethylene material and has voids greater than about 3 inches.

4. A system as defined in claim 1, wherein the plurality of perimeter cables are formed from a stainless steel cable.

5. A system as defined in claim 1, further comprising:
    a pair of ferrules each securing a cable loop to one of the strands of a perimeter portion of the netting; and
    one of the plurality of tie-downs is secured to the cable loop when the netting is in the deployed position.

6. A system as defined in claim 1, wherein the plurality of perimeter cables includes at least 3 vertically spaced perimeter cables.

7. A system as defined in claim 1, wherein the plurality of anchors comprises an anchor spaced outward from each primary corner of the structure.

8. A system as defined in claim 1, wherein a roof portion of the netting is positioned over the roof when the netting is in both the deployed position and the storage position, and the system further comprises:
    a roll deployment device for releasing the roll of netting for deployment from the storage position to the deployed position.

9. A system as defined in claim 8, wherein the roll deployment device consists of a daisy loop line which releases the wound roll when pulled.

10. A system as defined in claim 8, further comprising:
    a deployment line for releasing when the roll deployment device is deployed, such that the deployment line assists in the unrolling the wound roll of netting.

11. A system for protecting a structure including a roof from wind damage, the structure supported on a plurality of structure supporting pilings each extending above the ground level, the system comprising:
    a netting for positioning over the roof of the structure, the netting having a deployed position wherein a perimeter portion of the netting is spaced below the roof of the structure, and the netting having a storage position wherein a portion of the netting is in a roll adjacent a roof overhang;
    a plurality of anchors each at least partially below ground level and entirely spaced from the structure;
    at least two perimeter cables each woven between strands of the perimeter portion of the netting;
    a plurality of piling tie-downs each interconnecting a respective one of the at least two perimeter cables to a respective one said anchor of the plurality of structure supporting pilings when the netting is in the deployed position; and a plurality of anchor tie-downs each interconnecting each of the at least two perimeter cables to one of the plurality of anchors.

12. A system as defined in claim 11, wherein the at least one perimeter cable comprises:

a plurality of perimeter cables each about the perimeter portion of the netting when deployed, the plurality of perimeter cables including a low cable secured to the netting and a high cable secured to the perimeter portion of the netting above the low cable when the netting is in the deployed position.

13. A system as defined in claim 11, further comprising:

a device for tensioning each of a plurality of anchor tie-downs, when the netting is in the deployed position.

14. A system as defined in claim 11, wherein the netting is formed from a polyethylene material and has voids from about 3 inches to about 5 inches, and the plurality of tie-downs are each formed from stainless steel cable.

15. A system as defined in claim 11, wherein a roof portion of the netting is positioned over the roof prior to deployment, and the perimeter portion of the netting is wound in a roll positioned adjacent said roof overhang in the storage position prior to deployment, and the system further comprises:

a roll deployment device for releasing the roll of netting for deployment.

16. A system as defined in claim 11, wherein the plurality of anchors comprises an anchor spaced outward from each primary corner of the structure.

17. A system as defined in claim 11, further comprising:

a pair of ferrules each securing a cable loop to one of the strands of a perimeter portion of the netting; and one of the plurality of tie-downs is secured to the cable loop when the netting is in the deployed position.

* * * * *